United States Patent [19]

Crosby

[11] 3,845,391

[45] Oct. 29, 1974

[54] COMMUNICATION INCLUDING SUBMERGED IDENTIFICATION SIGNAL

[75] Inventor: Murray G. Crosby, Syosset, Long Island, N.Y.

[73] Assignee: Audicom Corporation, New York, N.Y.

[22] Filed: July 15, 1971

[21] Appl. No.: 162,774

Related U.S. Application Data

[63] Continuation-in-part of Ser. No. 848,381, July 8, 1969, abandoned, which is a continuation-in-part of Ser. No. 530,563, Feb. 28, 1966.

[52] U.S. Cl. .................................. 325/64, 343/225

[51] Int. Cl. ............................................ H04h 9/00

[58] Field of Search .......... 179/2, 2 TC, 3, 100.2 R; 325/31, 51, 52, 64, 55, 66, 392, 396, 311, 37; 178/5.6; 343/225–228

[56] References Cited

UNITED STATES PATENTS

| | | | |
|---|---|---|---|
| 1,922,627 | 8/1933 | Mathes | 325/52 |
| 2,513,360 | 7/1950 | Rahmel | 325/31 |
| 2,630,525 | 3/1953 | Tomberlin et al. | 325/64 |
| 2,671,166 | 3/1954 | O'Brien | 325/64 X |
| 3,044,018 | 7/1962 | Wilson | 325/63 X |
| 3,387,212 | 6/1968 | Kaufman | 325/64 X |
| 3,397,401 | 8/1968 | Winterbottom | 325/64 X |
| 3,406,344 | 10/1968 | Hopper | 325/66 X |
| 3,613,004 | 10/1971 | Wycoff | 325/64 X |

*Primary Examiner*—Benedict V. Safourek
*Attorney, Agent, or Firm*—Ryder, McAulay, Fields, Fisher & Goldstein

[57] ABSTRACT

A technique for identifying a program with an identification code in which the code is modulated onto an audio frequency subcarrier and transmitted with the program. A short time period, narrow band width window is cut out of the program material to accommodate the code carrying modulated audio subcarrier. The amount by which the code modulates the subcarrier is made to track with the audio envelope of the program and thus minimizes the listener's ability to hear the code. The receiver equipment automatically responds to the presence of the subcarrier and detects the code. Unmodulated subcarrier is transmitted immediately prior to the code modulation to assure that there is no ambiguity between the code signal and program material. Automatic frequency control responsive to the unmodulated subcarrier compensates for tape or disc recorder speed variation. The automatic frequency control is disabled during the actual code transmission to prevent a receiver response that might wipe out the code signal.

17 Claims, 5 Drawing Figures

COMMUNICATION INCLUDING SUBMERGED IDENTIFICATION SIGNAL

CROSS REFERENCE TO RELATED APPLICATIONS

This is a continuation-in-part of a patent application Ser. No. 848,381 filed July 8, 1969, now abandoned, which in turn was a continuation-in-part of now abandoned patent application Ser. No. 530,563 filed Feb. 28, 1966. Both of these patent applications were entitled: Communication Including Submerged Identification Signal.

BACKGROUND OF THE INVENTION

This invention relates in general to a communication system and more particularly to a technique for providing a unique identification code for any broadcast program material, and in particular for advertising, so that an appropriate receiver can detect the code and identify that the program has been sent.

There are a number of systems that have been developed and proposed for transmitting auxiliary information along with the main program being broadcast. Super-audible and sub-audible subcarrier transmission has been used in the prior art for achieving such multiplexing of an allocated broadcast channel. Some idea of the scope of techniques employed can be obtained from a review of U.S. Pat. Nos. 2,766,374; 3,061,783 and 3,391,340. These known techniques are not particularly well adapted to the transmission of unobtrusive coding signals for identifying and verifying the transmission of particular programs.

In general, the known and proposed techniques employ an unacceptably large portion of the program channel. In particular, there is too much interference with the program material.

Accordingly, it is a major purpose of this invention to provide a coding technique for identifying a program, wherein the coding technique occupies a minimum amount of program space.

In particular, it is an important purpose of this invention to provide a program identification technique that is unnoticed by the listener.

One current technique for monitoring advertisements on television is to hire individuals around the country who look at television and make a record of the time, nature and duration of various advertisements. This technique is expensive, subject to some degree of error and cost considerations greatly limit its use.

Accordingly, it is another important purpose of this invention to provide an identification technique for program material that is automatic on the receiving end and does not require a human monitor.

The cost of human monitoring is sufficiently great so that it can be used only in connection with television and not in connection with radio, and even at that, only on a sampling basis.

Accordingly, it is another purpose of this invention to provide an automatic program monitoring technique that can be employed in both television and radio broadcasting.

BRIEF DESCRIPTION OF THE INVENTION

This invention is a technique for identifying and verifying the transmission of and duration of recorded radio and television program material including advertising and recorded music. A binary identification code is modulated onto an audio frequency subcarrier to provide a narrow band modulated subcarrier requiring a channel of one hundred Hertz (Hz) in width.

The audio subcarrier is transmitted for about three seconds at the beginning, and for about three seconds at the end of the program material being identified. The audio subcarrier is frequency shift modulated with the binary code signal for the latter part of that three second time period. During the three second period when the audio subcarrier is added to the program material, a band stop filter is switched in to filter out the program material over the one hundred Hz subcarrier channel width. The band stop filter is switched out at the end of the three second time period. Thus a three second long, one hundred Hz wide window is provided in the program material to accommodate the code.

The magnitude of the audio subcarrier signal (whether or not modulated by the code) is made to track with the audio level of the program so that the amplitude of the audio subcarrier (that is, the modulated audio subcarrier) can be as low as possible to provide accurate code detection at the receiver while remaining unnoticed by the listener.

In one embodiment, when program audio level is nil, the subcarrier is fifty-five decibels (db) down from the audio level that provide 100 percent carrier modulation. When program audio is at a level that will modulate the carrier 100 percent, then the audio subcarrier is forty db down from that program audio level.

A band pass filter in the receiver passes only the modulated subcarrier, which subcarrier is then demodulated to provide the binary identification code for the program involved.

The audio frequency subcarrier is run unmodulated for 1.5 seconds prior to being modulated by the 1.1 second duration binary identification code. The relatively long (1.5 second in duration) continuous tone, which is the unmodulated subcarrier, provides a condition that enables the code receiver to distinguish between the immediately following code modulated audio subcarrier and other audio signals that might be present, particularly when music is played.

An automatic frequency control (AFC) system at the receiver overcomes the de-tuning of the audio frequency subcarrier that occurs due to such factors as variations in tape or disc recorder speed. The AFC locks onto the audio subcarrier during the 1.5 second period of unmodulated subcarrier transmission prior to code transmission. The binary code is modulated onto the subcarrier by a frequency shift key (FSK) generator. Thus for the condition of "mark" the subcarrier is up thirty-five Hz from the center frequency and for the condition of "space" the subcarrier is down thirty-five Hz from center frequency. To avoid having the AFC wipe out the identification code which is modulated onto the audio subcarrier by a frequency shift modulation, the AFC is frozen to a fixed tuning immediately prior to the appearance of the modulation (the identification code) on the subcarrier.

DESCRIPTION OF THE PREFERRED EMBODIMENTS

One of the most important contemplated applications for this invention is in the encoding of advertising that is being sent on either television or radio. Accordingly, in order to give some focus to the description of an embodiment of this invention, the embodiment involved will be one that is adapted to be employed for encoding recorded advertising and the description will assume such an application.

Figures 1, 1A:
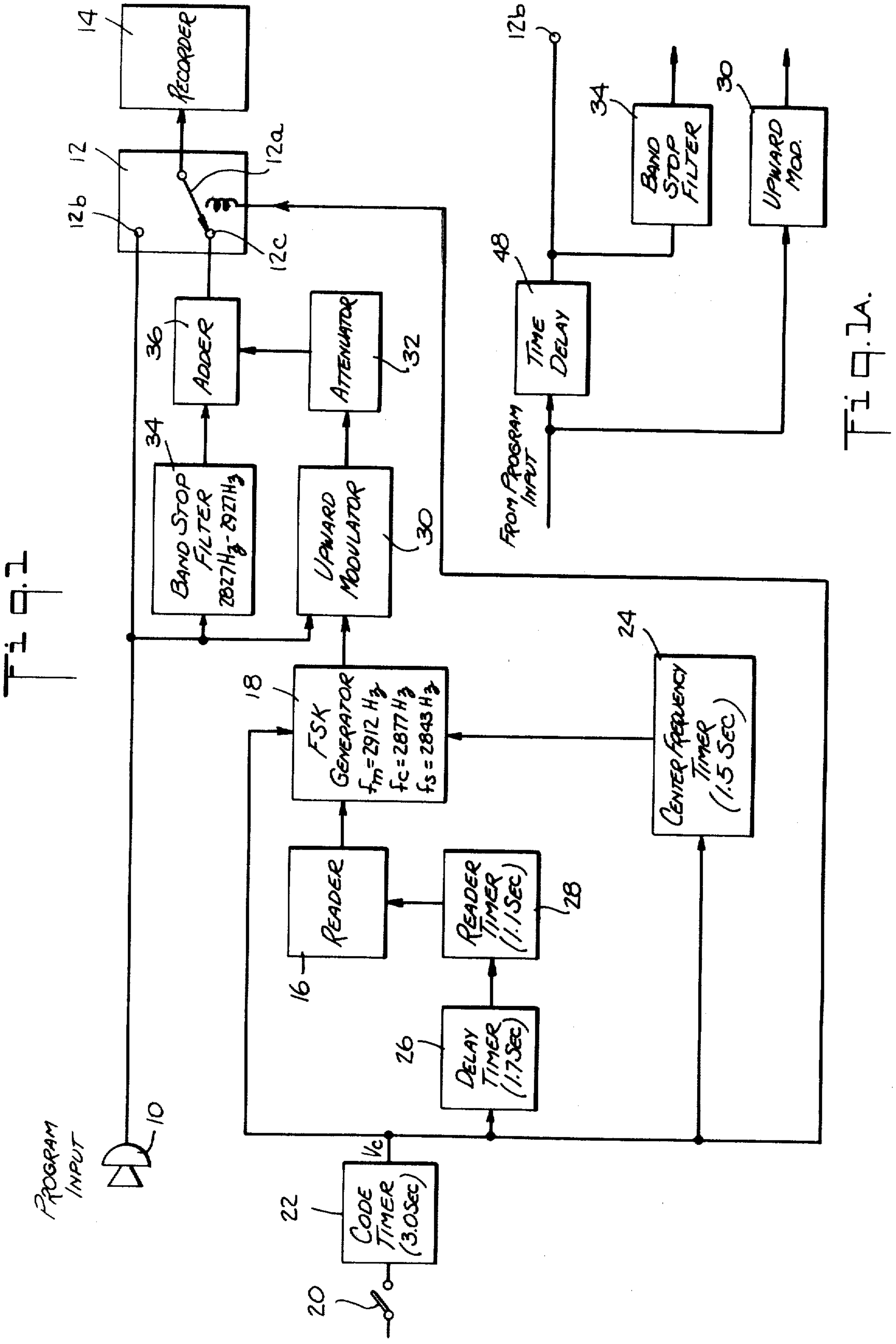
FIG. 1 is a block diagram of that portion of the system of this invention which adds the identifying code to the program material so that combined code and program can be placed on a record.
FIG. 1A illustrates a variant of FIG. 1 in which a time delay unit is employed to assure that the modulation volume for the code is synchronized in time with program volume.
Figure 2:
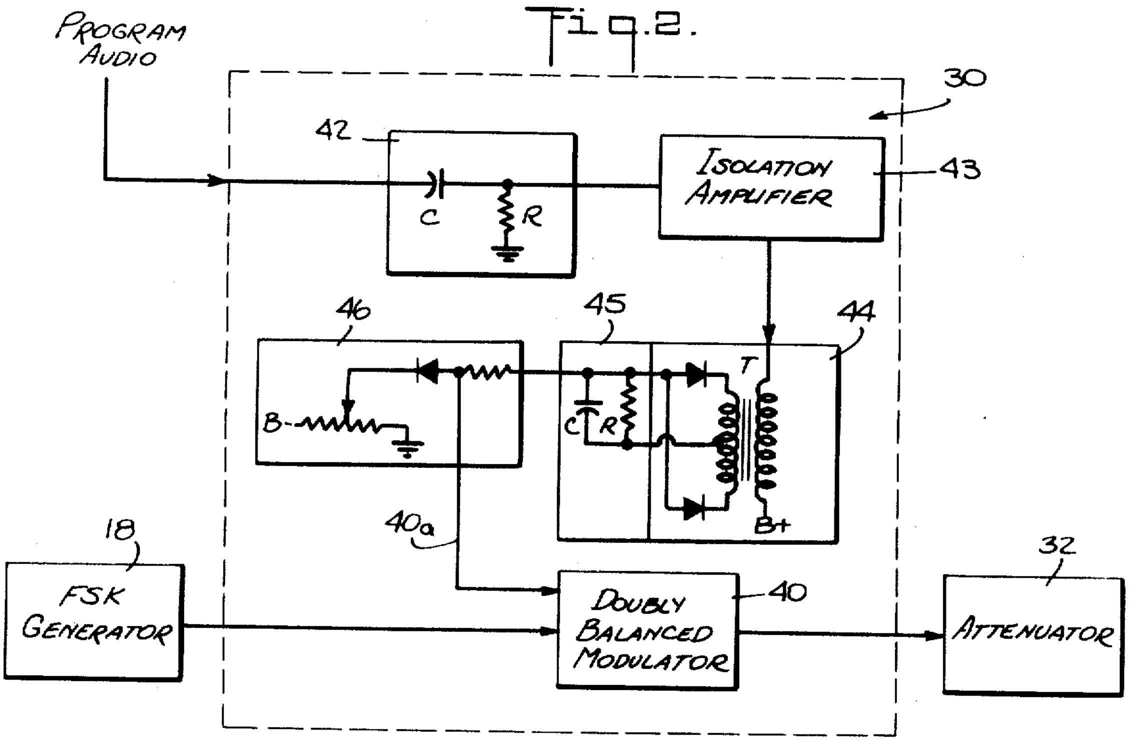
FIG. 2 is a block and schematic diagram of the upward modulator 30 of FIG. 1.

The block and electrical schematic diagrams of FIGS. 1 and 2 illustrate the equipment required to add the code to the advertising when recording the advertising on a disc or tape.

The Basic Encoder (FIG. 1)

The advertising message, which may be picked up live by microphone 10 is normally transmitted directly through a switch 12 to a recorder 14, such as a disc or tape recorder. Under this normal operation, the state of the switch 12 is not as shown in FIG. 1 but rather the movable arm **12*a* will be connected to the terminal 12*b* so that the program will be directly passed through the switch 12 to the recorder 14. However, for the short time the code is being added to the advertising, the state of the switch 12 will be as shown with the movable arm 12*a* connected to the terminal 12*c***.

The reader 16 generates the identifying code that is added to the recorded program. In one embodiment, the code is an eight character code, each character requiring an eleven-bit binary code. In that embodiment, employing a 7.5 character per second transmission rate, the total duration of the eight character (88 bit) identifying code is 1.1 seconds. A code is applied at the beginning of the advertising message and again at the end of the advertising message. The receiver thus can determine not only that the advertising message has been sent and that it is the right advertising message, but also that the message has been sent from beginning to end and, further by means of a clock in the receiver, the receiver can determine the duration of the advertising message as recorded and as transmitted.

The output of the reader 16 is applied as a binary code to modulate the frequency shift key (FSK) generator 18. The relationship between the reader 16 and FSK generator 18 is such that when the reader code output is a one bit, the generator 18 output is its mark frequency $f_m$ and when the reader 16 output is a zero bit, the generator 18 output is shifted to its space frequency $f_s$. The mark frequency of generator 18 is 35 Hz above center frequency and thus is, 2,912 Hz. The space frequency of the FSK generator 18 is 70 Hz down from the frequency at the mark state and thus is 2,843 Hz.

The FSK generator 18 is turned on for a short period of time (1.7 seconds) prior to the reader 16 being turned on. During the first 1.5 seconds of that 1.7 second time period, the output of the FSK generator is held at the center frequency $f_c$ of 2,877 Hz. Thus, the FSK generator 18 output has three separate frequency values, all in the relatively high audio frequency range and covering a shift frequency range substantially 70 Hz. These three audio frequency values are added to the audio program material. The succession of frequency shifts between the mark frequency $f_m$ and the space frequency $f_s$ constitute the code that identifies the program material. The center frequency $f_c$ is used to identify the code transmission to the receiver. The center frequency plus the code frequencies plus the standby mark frequency are called herein the code signal.

It should be recognized that the FSK generator 18 has the mark frequency of 2,912 Hz as a standby frequency and that it is the application of the timer 24 (described below) output which shifts the FSK generator 18 output down 35 Hz to provide the center frequency output of 2,877 Hz and that it is the application of the space signal from the reader 16 which shifts the generator 18 output down 70 Hz to provide the space output frequency of 2,843 Hz. The center frequency of 2,877 Hz is called a center frequency herein because that is the center of the code transmission channel and that frequency is halfway between the mark frequency and the space frequency.

The FSK generator 18 and reader 16 are not turned on except for the purpose of applying the coding signal. Thus, both of these units 16, 18 are normally off. At the beginning of the program which is to be encoded, an operator closes the switch 20, thereby starting a code timer 22. The code timer 22 provides an enabling signal $V_c$ at its output for a period of, for example, 3.0 seconds. This enabling signal $V_c$ turns on the FSK generator 18.

This enabling signal $V_c$ also starts a timer 24 operating. This timer 24 is called herein a center frequency timer because the output of the timer 24 shifts the FSK generator 18 to its center frequency (2,877 Hz) state and holds it in that state for a period, in this embodiment, of 1.5 seconds. During this 1.5 second period, the FSK generator 18 will not be receiving reader 16 output. More importantly, during this 1.5 second period, generator 18 output is exactly at the center frequency of 2,877 Hz. The value of having the FSK generator 18 output exactly on the center frequency for a short period of time prior to application of the reader 16 output will become clear in connection with the detailed description of the receiver. At this point, let it suffice to be said that this 1.5 second duration of a predetermined center frequency output assures that the decoding receiver (FIG. 3) has a basis on which to distinguish between code signal and program signal.

This enabling signal $V_c$ also switches the state of the switch 12 to the state shown so that the signal recorded on the recorder 14 is the program, plus the encoding.

Finally, this enabling signal $V_c$ turns on a delay timer 26, which delay timer 26, after a period of 1.7 seconds, turns on the reader timer 28. During the 0.2 seconds between turn off of the timer 24 and turn on of the tiner 28, the generator 18 puts out its standby signal, which is a mark signal. The reader timer 28, once turned on, causes the reader 16 to start generating the code to be applied to the program material. The reader timer is on for a period of 1.1 seconds which is sufficient time for the reader 16 to apply eight characters, each requiring an eleven bit binary code of mark and space signals to the input of the FSK generator 18.

Thus, it may be seen, by virtue of the timers 22, 24, 26 and 28, arranged in the fashion shown, that the following sequencing takes place after the switch 20 is actuated by an operator:

1. The switch 12 is switched into the encoding state as shown.
2. Simultaneously, the FSK generator 18 is turned on and its output is held at its predetermined center frequency for 1.5 seconds.
3. Then, for 0.2 seconds, the generator 18 output is the standby mark signal.
4. Then the reader 16 is turned on for 1.1 seconds and generates its pre-programmed mark and space code, which code has been programmed to uniquely identify the particular program input.
5. After the reader 16 is turned off, there is a 0.2 second time period before the code timer 22 turns off. During this last 0.2 second period, the generator 18 is in its standby mark frequency output state (2,912 Hz).
6. Then the code timer 22 turns off and the enabling signal $V_e$ turns off so that (a) the switch 12 switches back to its normal state connecting the terminal 12*b* to the recorder 14 and (b) the generator 18 turns off.

The output of the FSK generator 18 is, as can be seen from the above description, initially 1.5 seconds after frequency followed by 0.2 seconds of mark frequency, followed by 1.1 seconds of reader output predetermined mark and space frequencies.

The output of this generator 18 is applied to upward modulator 30. The function of this upward modulator 30, (the structure of which is described in more detail in connection with FIG. 2) is to increase the amplitude of the FSK generator 18 output audio signal as a function of the program audio level. Accordingly, the output of the modulator 30 is the same as the input, except that the level of the output is increased by an amount that directly relates to the magnitude of an envelope of the program audio signal.

The attenuator 32 serves as an isolating amplitude. It attenuates because the modulator 30 output is bound to be at a much higher volume level than is desirable to be added to the programmed material. This attenuator assures that the FSK generator 18 output frequencies $f_m$, $f_c$ and $f_s$ are added to program material at a level which is between forty and fifty-five decibels down from the level of program material that will produce 100 percent modulation on the carrier.

The band stop filter 34 performs a very important function of cutting out a narrow frequency band from the program material when the recording apparatus is in the state shown in FIG. 1. With the switch 12 shown as in FIG. 1, the program input is applied to the band stop filter 34. The filter 34 cuts out all frequencies in a one hundred Hz band from 2,827 Hz to 2,927 Hz. The adder 36 simply adds the program material with the frequency window cut out of it by the filter 34 and the properly attenuated modulated subcarrier signal from the attenuator 32 to provide the audio input for the recorder 14.

It should be noted that the switch 12 is in the encoding state shown for only three seconds at a time and that it is only during this three second time period that the band stop filter 34 functions to cut out the narrow one hundred Hz band from the program material. Thus, a frequency window of one hundred Hz with this three second duration is provided. It is, so to speak, through this window that the encoded information passes as a frequency shift key type of modulation on an audio frequency signal. Thus, the amount of detraction from program material is minimal.

It should be noted that the forty to fifty-five db down range is a range found satisfactory in one embodiment. It is expected that the technique of this invention will permit the low end of the range to be as low as 60 db down from 100 percent program audio modulation.

Upward Modulator (FIG. 2)

FIG. 2 illustrates in greater detail the structure of the upward modulator 30 shown and described in connection with FIG. 1. The first unit in the upward modulator 30 is a doubly balanced modulator 40 of a known type. In one embodiment a four quadrant multiplier integrated circuit, Type No. MC 1494, manufactured by Motorola or by Fairchild, was employed.

A doubly balanced modulator provides amplitude modulation of a carrier with suppression of the carrier frequency so that only the side bands are provided. In this invention, one of the two inputs to the doubly balanced modulator 40 is the relatively high audio frequency outputs of the FSK generator 18. The other input, on line 40*a*, is a signal of only a few Hertz because it is developed as an envelope of the program audio. Thus, when there is a signal on the line 40*a*, the side bands of the generator 18 output frequency that are provided as the output of the modulator 40 are within a few Hertz of the generator 18 output frequency. From the point of view of the code channel and of the overall system, this few Hertz displacement of generator 18 frequency can be ignored. But from the point of view of the operation of the doubly balanced modulator 40, this side band generation means that the amplitude of the output from the doubly balanced modulator 40 is a function of the amplitude of an envelope signal on the line 40*a*.

The modulator 40 is unbalanced slightly so that when the input to the modulator 40 on line 40*a* is zero, there will be a modulator 40 output having the frequency of the FSK generator 18 output. This modulator 40 output when program audio level is zero is set to have a relatively low predetermined amplitude such that the amplitude of the code signal provided at the adder 36 is fifty-five db down from the audio level that provides 100 percent carrier modulation. As the magnitude of the signal on the input line 40*a* to the modulator 40 increases above zero volts, then the modulator 40 output amplitude increases since increasing amplitude side bands are generated.

The values for the various components in FIG. 2 are selected such that when an audio signal from the program material is supplied that has an amplitude equal or greater than that which will provide 100 percent carrier modulation, then the magnitude of the signal at the line 40*a* is at a maximum. This maximum amplitude audio envelope generates a modulator 40 output which is fifteen db above the modulator 40 output when program audio amplitude is zero. Thus, the maximum amplitude of code signal added by the adder 36 is 40 decibels below the audio level which provides 100 percent modulation. To achieve this result at the line 40*a* there is employed a high pass audio filter 42, an amplifier 43, a full wave rectifier 44, an envelope following (or ripple smoothing) circuit 45 and a DC limiter circuit 46.

For the embodiment described, the resistor and capacitor in the high pass audio filter 42 are selected to start significantly cutting out at frequencies below one-half of the space frequency of 2,843 Hz. Thus low audio program frequencies which are substantially removed from code channel frequencies do not affect the degree or extent of upward modulation. This is because the input filters at the decoder in the receiver end of the system will so completely cut out the lower audio frequencies that there is no need to increase the modulation of the code signals except in response to program frequencies that are closer to code channel frequencies.

The amplifier 43 provides isolation and assures that the transformer T is driven properly.

The full wave rectifier 44 rectifies the filtered program audio signal and the resistor and capacitor ripple smoothing network 45 provide an envelope following function on the rectified audio.

The time constant of the RC network 45 should be as brief as possible in order to obtain minimum delay in response to program audio amplitude so that the magnitude of the code signal at the adder 36 is in fact an accurate function of the program amplitude at the adder 36. However, it is also important that the time constant of the RC network 45 be long enough to cut out the ripple from the rectification of the program. A time constant in the order of one to five milliseconds has been found satisfactory to meet both of these objections. The optimum time constant is in part a function of the bit rate from the FSK generator 18.

The limiter circuit 46 assures that there is a maximum modulating signal applied to the modulator 40 so that the code signal transmitted never has a greater amplitude than 40 db down from maximum program audio. If program audio to the upward modulator 30 is otherwise properly limited, this limiter 46 may not be needed.

As indicated above, the ripple smoothing network 45 introduces a time constant which in turn provides a delay in the response of the modulator 40 to the amplitude of the program audio envelope. As a consequence of this delay, the amplitude of the code signal provided at the adder 36 may lag behind the optimum or desired amplitude which is called for by the amplitude of the program signal provided at the adder 36. As shown in FIG. 1A, a time delay unit 48 may be employed to provide a compensating delay for the program signal. In such a case, the undelayed program signal is applied to the upward modulator 30 and the delayed program signal is applied to the band stop filter 34. If employed, the time delay unit 48 is maintained in the circuit during the time when code is not being added because to switch the time delay unit in and out of the flow of program signal would create a disturbing gap equal to the amount of time delay in the program material.

It is this ripple smoothing network 45 which assures that the modulator 40 tracks with an envelope of the program audio signal. The time constant of the network 45 will determine what envelope is employed with the signal with which the modulator 40 tracks.

Figure 3:
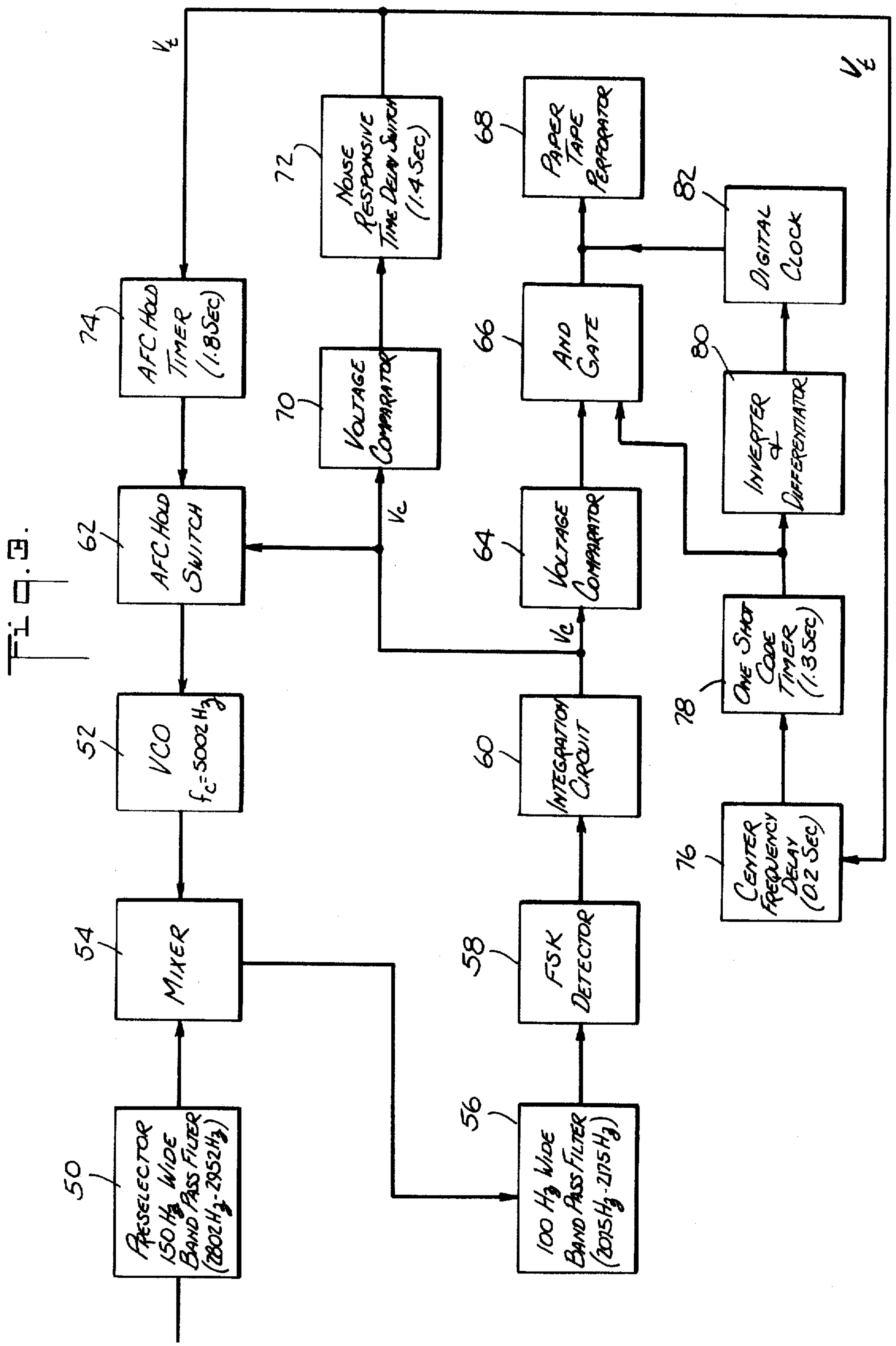
FIG. 3 is a block diagram of the automatic receiving unit for detecting and recording the identification code.

The Basic Decoder (FIG. 3)

At the receiving end of the transmitted encoded program, there is a decoder mechanism that operates in connection with the audio receiver for automatically recording the code transmitted and for indicating the time at which the code was received. In one preferred embodiment, this automatic receiver end record is maintained on a punched paper tape. Obviously, other recording media could be used.

As shown in FIG. 3, the audio channel output of the receiver is applied to a pre-selector band pass filter 50. This band pass filter 50 has a 150 Hz band width (2,802 Hz to 2,952 Hz). The band width of this filter 50 is greater than the 100 Hz code channel because of the necessity to accommodate for shifts in the frequency position of the channel due primarily to disc or tape record speed variations at the transmitter end.

Because the decoder circuit responds to the mark frequency and the space frequency to provide an appropriate binary input for the paper tape perforator, it is important that the frequency which represents the mark condition be constant and repeatable and that the frequency which represents the space condition also be constant and repeatable. If speed errors in the transmitting record are not compensated in the decoder, there is a risk that the detector will respond to these signals incorrectly and produce a false reading on the paper tape perforator. A preferred form of compensating for this frequency deviation has been found to be the use of an automatic frequency control technique. In order to make possible this automatic frequency control, the output of the pre-selector filter 50 is heterodyned with the output from a voltage controlled oscillator (VCO) 52 through a mixer 54. In one embodiment, the center frequency of the VCO 52 is 5,002 Hz. The mixer 54 provides the difference frequency as an input to a 100 Hz wide band pass filter 56. With the VCO 52 center frequency being 5,002 Hz and the pre-selector filter 50 center frequency being 2,877 Hz, the center frequency of the 100 Hz wide band pass filter 56 is therefore designed to be 2,125 Hz. As a consequence, during detection of the code signal, the only substantial input to the FSK detector 58 is the contents of the 100 Hz wide code channel.

The FSK detector 58 includes a limiter to remove any amplitude modulation that might exist. The detector function itself may be performed by a gate FM detector of the type described in U.S. Pat. No. 2,470,240. Integrated circuits that perform both the limiting and gate detection functions are manufactured by Sprague Electric Co., of Worcester, Mass. under the Type No. UL-N-2111 and also by Motorola of Chicago, Ill. under Type No. MC 1351P.

The FSK detector 58 provides a pulse train output that is duty cycle modulated as a function of the frequency of the input signal to the FSK detector 58. In one embodiment, the repetition rate of the FSK output pulse train is 4,250 pulses per second, essentially double the expected center frequency of the input signal to the detector 58. In this embodiment, the duty cycle of the output pulses is 50 percent when the input frequency to the detector 58 is 2,125 Hz. As the input frequency increases, the duty cycle of the output pulses increases and as the input frequency decreases, the duty cycle of the output pulses decreases. The pulse train output from the detector 58 is fed to an integration circuit 60 (such as an RC circuit) in order to provide a code voltage $V_c$. This code voltage $V_c$ has a voltage amplitude value which is a function of the duty cycle of the FSK detector 58 output and thus is a function of the frequency of the received code channel signal. In one embodiment, the value of the voltage $V_c$ is six volts when a center frequency signal is received, nine volts when a mark frequency signal is received and three volts when a space frequency signal is received.

During the first 1.5 seconds of the three seconds during which thecode channel is transmitted, the center frequency from the FSK generator 18 is received by the FIG. 3 decoder unit. If the center frequency is received exactly on frequency (that is, at 2,877 Hz), the output of the band pass filter 56 will be 2,125 Hz thereby providing a 50 percent duty cycle detector 58 output and a six volt value for the code voltage $V_c$. The AFC hold switch 62 is normally closed and thus the six volt $V_c$ signal is applied to the VCO 52 to hold the VCO 52 at its center frequency of 5,002 Hz. During this initial time period, deviation of the received signal frequency from the 2,877 Hz center frequency value results in deviation of the code voltage $V_c$ value and thus of the VCO 52 output frequency in a direction that tends to bring the frequency of the signal applied to the band pass filter 56 toward the center frequency value of 2,125 Hz. By the AFC technique, the FIG. 3 decoder tends to compensate for frequency deviations in the transmitted signals on the code channel.

The code voltage $V_c$ is also applied to a voltage comparator 64. This comparator 64 is adjusted to a voltage tripping level to provide a steady state output voltage of, for example, 2.5 volts when the input value to the voltage comparator 64 is above the tripping level. In this embodiment, the tripping level is selected to be 6.0 volts. Thus, when the input to the FIG. 3 decoder is space frequency, the output of the comparator 64 will be essentially zero. However, when a mark frequency signal is received, the output of the comparator 64 will be the 2.5 volt level. Providing that the AND gate 66 is enabled, this 2.5 volt signal will be passed through to the paper tape perforator 68 to provide an appropriate paper tape record of received signal. The voltage comparator 64 is of a known type and may be a Fairchild UL 710 device or a Motorola MC 1710 device.

As described below, this AND gate 66 is enabled only when the code mark and space frequencies are received. Thus, the perforator 68 receives only 2.5 volt inputs when a mark frequency is received, and zero volt inputs when a space frequency is received.

The code voltage $V_c$ is further applied to a second voltage comparator 70. In this embodiment, the comparator 70 is adjusted to a tripping voltage of either 4.5 or 7.5 volts so that it will provide a steady state output signal in response to the receipt at the FIG. 3 decoder of the center frequency signal. Otherwise, the voltage comparator 70 is the same type of unit as the comparator 64. Prior to the receipt of the 1.5 second center frequency signal, the noise in the system and from the program will result in the comparator 70 output being a series of pulses that can be considered noise. The noise responsive time delay switch 72 is turned off and held in an off state by noise or by any rapidly varying signal. When the code channel is opened, as at the beginning of an encoded advertisement, the initial portion of the signal received is a 1.5 second in duration center frequency signal. As a consequence of receipt of this signal, the code voltage $V_c$ is constant in value, the output of the voltage comparator 70 will be quieted and the input to the switch 72 will be at a steady state voltage of 2.5 volts. The exact operation of this switch 72 is described in greater detail in connection with FIG. 4. Suffice it to indicate at this point that the switch 72 reacts to the steady state, non-noisy input by turning on after a delay of 1.4 seconds and applying a timing voltage $Vt$ to the AFC hold timer 74.

In response to this timing voltage $Vt$, the AFC hold timer 74 turns on and applies a signal to the AFC hold switch 62 to open the AFC hold switch 62. This opening of the switch 62 removes the code voltage $V_c$ from the VCO 52 and freezes the VCO 52 at whatever output frequency the VCO 52 had when the switch 62 was opened. In this fashion, the AFC function of the FIG. 3 decoder is frozen 1.4 seconds after receipt of the signal in the code channel and thus prior to receipt of the mark and space frequencies in the code channel. The AFC hold timer 74 has a 1.8 second on period so that it maintains the switch 62 open for 1.8 seconds after receipt of the timing signal $Vt$. This assures that the mark and space frequency signals will all have been received before the switch 62 is again closed.

This timing signal $Vt$ is also applied through a delay unit 76 to a timer 78. The timer 78 is a one-shot circuit having an on-time duration of 1.3 seconds. For this 1.3 second time period the AND gate 66 is enabled by the output of the one-shot timer 78 and thus during this 1.3 second time period the mark and space signals from the voltage comparator 64 are applied to the paper tape perforator 68. The delay unit 76 delays the application of timing pulse $Vt$ to the one-shot code timer 78 by a time of 0.2 seconds. Because of the 1.4 second delay due to the switch 72 and the 0.2 second delay in the unit 76, the one-shot timer 78 is not turned on until a total of 1.6 seconds after initial receipt of the signals in the code channel. This means that the 1.5 second in duration center frequency signal has been completed and the mark standby signal is in existence at the time that the AND gate 66 is enabled. Since the reader 16 (see FIG. 1) is not turned on until 1.7 seconds after the initiation of FSK generator 18 output, the 1.6 delay before enabling the gate 66 provides a 0.1 second leeway before mark and space code signals are received. Furthermore, since the reader is only on for 0.9 seconds, the 1.3 second output time of the code timer 78 provides adequate time within which to receive the entire coded signal.

The output of the one-shot timer 78 is also applied to an inverter and differentiator unit 80, which unit 80 is adapted to provide an output that will turn on a digital clock 82. The inverter and differentiator unit 80 assures that the clock 82 is not turned on until the timer 78 turns off and thus, the AND gate 66 is disabled. The output of the digital clock 82 is applied to the paper tape perforator 68 so that the time at the termination of the code will be recorded on the paper tape output of the perforator 68.

Figure 4:
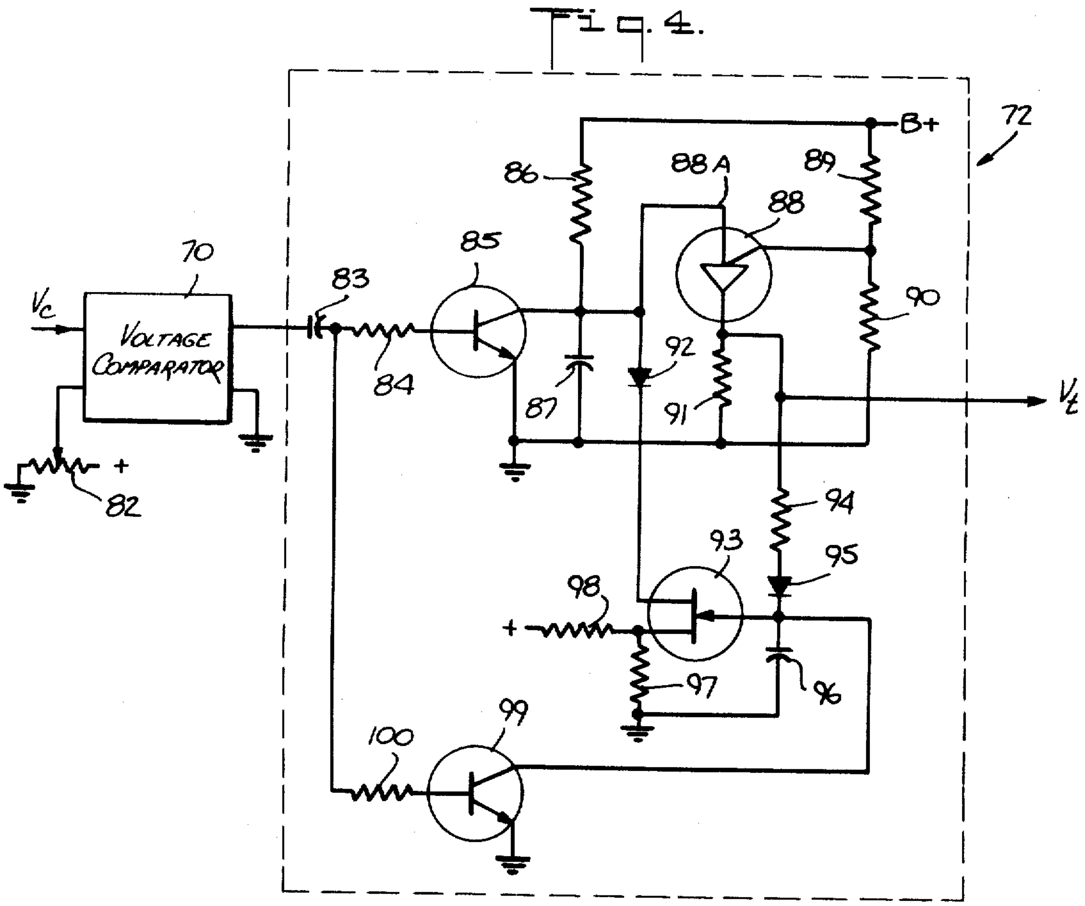
FIG. 4 is a block and schematic diagram of the noise responsive time delay switch 72 of FIG. 3.

Program to Code Signal Discrimination (FIG. 4)

The voltage comparator 70 and noise responsive time delay switch 72 provide a means to discriminate between program signal and the code signal. The importance of making this discrimination is to avoid erratic inputs to the paper tape perforator 68 (see FIG. 3). Some programs, and particularly certain types of musical programs involving the transmission of electronically produced music, will generate significant frequencies that will come through the band pass filters 50 and 56 (see FIG. 3). If this occurs occasionally, the result will simply be an input to the paper tape that quite obviously has no code message significance. But it has been found necessary to devise a technique for discriminating between the program and the code signal so that the incidence of meaningless paper tape input is kept to a minimum.

FIG. 4 illustrates the circuit arrangement of the noise responsive time delay switch 72 which makes possible discrimination between program and code signal. The arrangement of detector 58, integration circuit 60, comparator 70 and noise responsive switch 72, provides a combination that recognizes the relatively long duration 1.5 second continuous center frequency $f_c$ initial portion of the code signal and in response thereto provides a pulse output $Vt$. By virtue of the time it takes to build up a triggering voltage on a capacitor, this pulse $Vt$ is not provided until 1.4 seconds after initial receipt of the center frequency $f_c$ signal.

Because of the noise in the circuit, including program noise and resistor noise, the voltage comparator 70 is flipped between its output state and zero state at a fairly rapid rate. These noise pulses are differentiated by capacitor 83 and fed through limiting resistor 84 to clamp the transistor 85. The noise pulses fed to the base of the clamp transistor 85 cause the collector circuit of 85 to drop to a low value of resistance, thus clamping the capacitor 87 to near ground potential. By this means, the capacitor 87 cannot build up a charge from the voltage supplied through resistor 86. In the absence of rapidly varying pulses, the clamping effect of transistor 85 is removed and capacitor 87 builds up a charge and fires unijunction transistor 88. Transistor 88 is a programmable unijunction transistor (put) which has its firing voltage programmed by resistors 89 and 90. A type 2N6027 (formerly D13T1) may be employed for transistor 88. This transistor 88 will form a pulsing relaxation oscillator if only the circuit comprising elements 86, 87, 88, 89, 90 and 91 are connected. The pulses are formed by the voltage building up on capacitor 87 until it reaches the firing voltage of the unijunction transistor anode 88A. At this voltage the anode 88A draws a heavy current from capacitor 87, thereby discharging it. This current shows up as a sharp pulse across cathode resistor 91 which is used as the relaxation oscillator output.

With transistor 85 connected in the circuit, the noise pulses from the voltage comparator 70 periodically clamp capacitor 87 by the collector circuit of transistor 85 so as to hold the capacitor 87 almost completely discharged. It will only be completely discharged at the instant of the noise pulse and will rise in charge value between noise pulses. The result is a low average value of charge because the noise pulses are rapid compared to the relaxation charging time of capacitor 87.

When the center frequency code signal $f_c$ appears in the FSK detector 58, the noise pulses are quieted and the output of the comparator 70 is zero. This releases the clamp 85 so that the unijunction 88 fires after the time required for capacitor 87 to build up to the firing voltage.

Without the circuit comprising elements 92, 93, 94, 95, 96, 97, 98, 99 and 100, the unijunction relaxation oscillator would oscillate at a rate determined by the RC combination 86, 87. However for the purpose of the program to code signal discriminator, it is desirable that the unijunction 88 fire only once in response to the presence of the 1.5 second center frequency $f_c$ signal. This one pulse is used to trip the timers 74 and 76. These timers 74, 76 normally require only one pulse and additional pulses are undesirable.

The rest of the circuitry (elements 92–100) insure that only a single pulse is produced by the unijunction 88. The field-effect transistor 93 acts as a clamp on capacitor 87 after the unijunction 88 has fired the first time, and holds the clamp for the required amount of time until noise or other rapidly repeating pulses again appear at the output of the voltage comparator 70. This clamping of the capacitor 87 is accomplished by feeding the unijunction 88 output pulse through limiting resistor 94 and diode 95 to charge capacitor 96 up to the pulse output voltage. Diode 95 prevents the capacitor 96 from discharging through 94, and the gate of FET transistor 93 has a very high resistance so that capacitance 96 holds its charge without leakage. Source resistors 97 and 98 establish proper bias of transistor 93.

With capacitor 96 charged, transistor 93, through diode 92, clamps capacitor 87 so that capacitor 87 cannot build up its charge to the unijunction firing point even though the voltage comparator 70 continues to have zero output. However, when the noise pulses (or mark and space alternating signal induced pulses) reappear at the output of the comparator 70, they pass through resistor 100 to actuate clamp transistor 99 which discharges capacitor 96 and makes the unijunction 88 ready for the next firing.

With the above operation of the unijunction timer 72, it can be seen that when the center frequency $f_c$ is present in the FSK detector 58 for an amount of time sufficiently long to allow capacitor 87 to build up to the firing point of the unijunction 88, there will be one pulse output. In this embodiment, the time of charge of 87 through resistor 86 is 1.4 seconds. This length of time is chosen to differentiate from muscial notes and thus avoid false tripping of the unijunction 88 which false tripping would open the decoder to spurious signals.

The potentiometer 82 on the voltage comparator 70 is set to provide either the 4.5 or 7.5 tripping voltage mentioned above. Setting the tripping voltage off from the 6.0 volt expected center frequency $f_c$ produced voltage results in a minimum of false trips during the release of the clamp 85.

I claim:

1. The system for encoding transmitted audio program material comprising:

encoding means for generating a substantially inaudible, audio frequency code signal, the frequency band width occupied by said code signal being within the frequency band width of the audio program signal and being at least a decade in magnitude less than the frequency band width of the audio program signal, said code signal having an initial portion and an identification code portion, said initial portion having a predetermined time duration sufficiently great to provide substantial distinction between said initial portion and the audio program material signal, said identification code portion having at least one parameter with a value distinct from the value of the corresponding parameter of said initial portion, first timing means coupled to said encoding means to limit the duration of said code signal to a first predetermined time period, first generating means in said encoding means for generating said initial portion of said code signal, second generating means in said encoding means for generating said identification code portion of said code signal, second timing means coupled to said second generating means for initiating the generation of said identification code portion after said initial portion has been generated for a second predetermined time period, said second predetermined time period being less that said first predetermined time period, and means transmitting said audio frequency code signal simultaneously with the transmission of the associated transmitted audio program material.

2. The system of claim 1 further comprising:

modulation means responsive to the amplitude of an envelope of the said program material signal to modulate the amplitude of said code signal as a function of the amplitude of the program material signal to provide a modulated code signal having a substantially lower amplitude at low audio program material signal levels than at high audio program material signal levels.

3. The system of claim 1 further comprising:

means to angle modulate said code signal on a subcarrier, the initial portion of said code signal having an invarient frequency, an angle modulation responsive detector at a receiver responsive to said subcarrier to provide a code identifying the program transmitted, a noise responsive first timing means responsive to the output of said detector to provide a first timing signal in response to the quieting of the output of said detector for a first predetermined time period during receipt of said initial portion of said code signal, a normally closed gate, said code being applied to the input of said gate, and second timing means responsive to said timing signal and coupled to said gate to open said gate for a second predetermined time period encompassing receipt of said code.

4. The system of claim 2 further comprising:

means to angle modulate said code signal on a subcarrier, the initial portion of said code signal having an invarient frequency, an angle modulation responsive detector at a receiver responsive to said subcarrier to provide a code identifying the program transmitted, a noise responsive first timing means responsive to the output of said detector to provide a first timing signal in response to the quieting of the output of said detector for a first predetermined time period during receipt of said initial portion of said code signal, a normally closed gate, said code being applied to the input of said gate, and second timing means responsive to said timing signal and coupled to said gate to open said gate for a second predetermined time period encompassing receipt of said code.

5. The system of claim 1 further comprising:

filter means to filter out those audio program material signal frequencies corresponding to the audio frequencies of said code signal to provide a filtered program signal, switch means to couple the path for the audio program material signal through said filter means substantially only when said code signal is being provided, and means to add said code signal and said filtered program signal.

6. The system of claim 4 further comprising:

filter means to filter out those audio program material signal frequencies corresponding to the audio frequencies of said code signal to provide a filtered program signal, switch means to couple the path for the audio program material signal through said filter means substantially only when said code signal is being provided, and means to add said code signal and said filtered program signal.

7. The system of claim 1 wherein:

said means for generating said code signal generates a code signal that occupies a narrow audio band, said initial portion comprising a first frequency near the center of said narrow audio band, and said identification code portion comprising second and third frequencies bracketing said first frequency and representing the bits of a binary code.

8. The system of claim 6 wherein:

said means for generating said code signal generates a code signal that occupies a narrow audio band, said initial portion comprising a first frequency near the center of said narrow audio band, and said identification code portion comprising second and third frequencies bracketing said first frequency and representing the bits of a binary code.

9. The system of claim 1 further comprising:

receiver means responsive solely to said initial portion to provide an enabling signal in response thereto, and recording means enabled by said enabling signal and when so enabled, responsive to said identification code portion to provide a record of that identification code portion.

10. The system of claim 1 further comprising:

first timing means at a receiver responsive to said initial portion of said code signal to provide a timing signal, detector means responsive to said identification code portion to provide a code indicative of the program transmitted, a normally closed gate, said code being applied to the input of said gate, second timing means responsive to said timing signal and coupled to said gate to open said gate for a predetermined time period synchronized to encompass receipt of said code.

11. The system of claim 1 further comprising:

a recorder coupled to the output of said gate to record said code, a clock having an output adapted to be recorded on said recorder, and third timing means to apply said output of said clock to said recorder after said predetermined time period determined by said second timing means.

12. An automatic code detecting apparatus for receiving a transmitted audio program signal containing a substantially inaudible audio frequency code signal, the code signal including an initial portion and a multi-bit identification code portion, said code signal being within the frequency band width of the audio program signal and occupying a frequency band width that is at least a decade in magnitude less than the frequency band width of said audio program signal, comprising:

detecting means for detecting the transmitted audio program signal, band pass filter means coupled to the output of said signal detecting means to pass substantially only those frequencies within said frequency band of said code signal, means coupled to the output of said band pass filter and responsive to said initial portion of said code signal to provide a timing signal, detector means responsive to said identification portion of said code signal to provide a code identifying the program transmitted, normally closed gating means, said code being applied to the input of said gating means, and first timing means responsive to said timing signal and coupled to said gating means to open said gating means for a predetermined time period encompassing receipt of said code.

13. The code detecting apparatus of claim 12 wherein said initial portion of said code signal has a constant frequency and said code signal is angle modulated onto a subcarrier, and wherein:

said detector means is an angle modulation detector responsive to said subcarrier, and said first timing means is noise responsive and responsive to the output of said detector to provide said first timing signal in response to the quieting of the output of said detector for a predetermined time period during receipt of said initial portion of said code signal.

14. The apparatus of claim 12 further comprising:

a recorder coupled to the output of said gating means to record said code, a clock having an output adapted to be recorded on said recorder, clock timing means to apply said output of said clock to said recorder after said predetermined time period determined by said first timing means.

15. The apparatus of claim 13 further comprising:

a recorder coupled to the output of said gating means to record said code, a clock having an output adapted to be recorded on said recorder, clock timing means to apply said output of said clock to said recorder after said predetermined time period determined by said first timing means.

16. The apparatus of claim 12 further comprising:

automatic frequency control means coupled to the output of said filter means and responsive to said initial portion of said code signal to provide frequency control for said code signal, and second timing means responsive to said timing signal to freeze said automatic frequency control prior to receipt of said identification code portion of said code signal.

17. The system of claim 15 further comprising:

automatic frequency control means at the receiver responsive to said initial portion of said code signal to provide frequency control for said code signal, and means responsive to said timing signal to freeze said automatic frequency control prior to receipt of said identification code portion of said code signal.

* * * * *

UNITED STATES PATENT OFFICE
CERTIFICATE OF CORRECTION

Patent No. 3,845,391 Dated October 29, 1974

Inventor(s) Murray G. Crosby

It is certified that error appears in the above-identified patent and that said Letters Patent are hereby corrected as shown below:

Col. 3 line 38, "12c" should read --12b--
Col. 4 line 6, "range substantially" should read --range of substantially--
Col. 5 line 30, "1.5 seconds after frequency" should read --1.5 seconds center frequency--
Col. 5 line 32, "output predetermined mark" should read --output determined mark--
Col. 5 line 44, "serves as an isolating amplitude" should read --serves as an isolating amplifier--
Col.12 line 17, "tance 96" should read --tor 96--.

Signed and sealed this 4th day of February 1975.

(SEAL)
Attest:

McCOY M. GIBSON JR.
Attesting Officer

C. MARSHALL DANN
Commissioner of Patents